Patented June 12, 1945

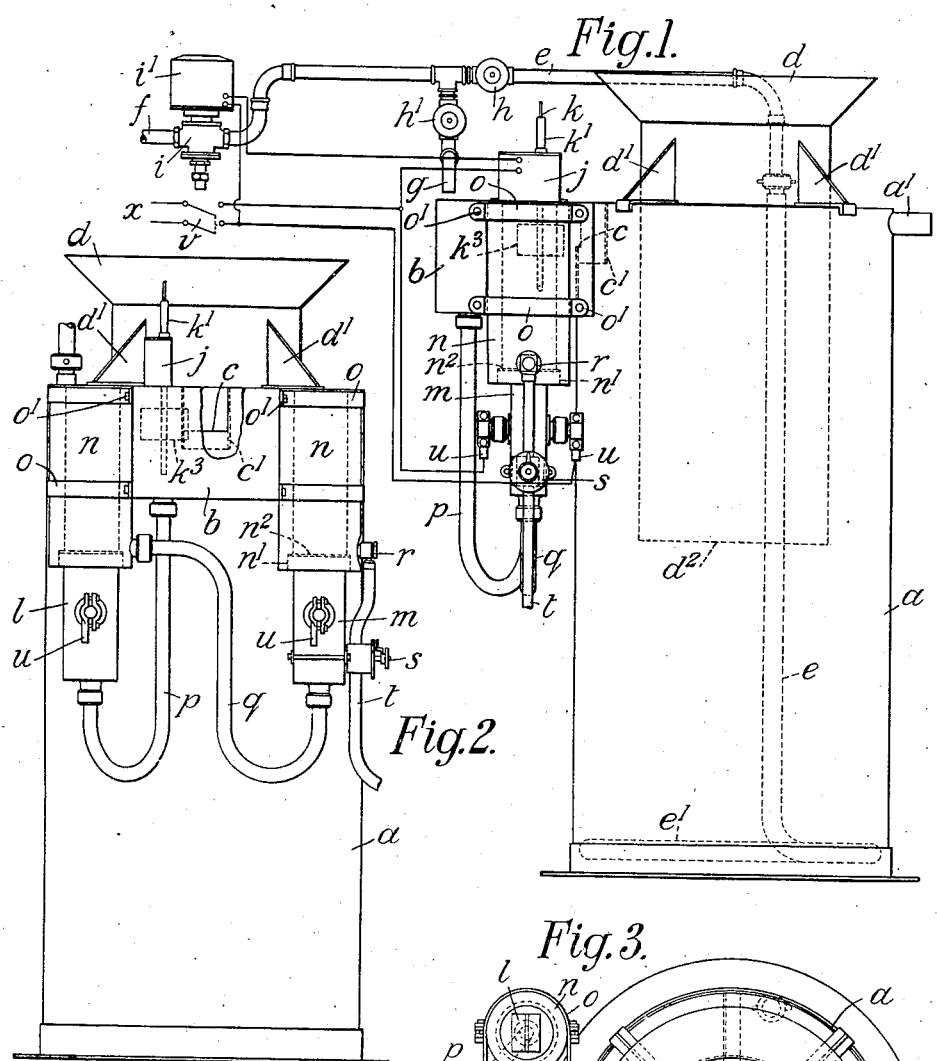
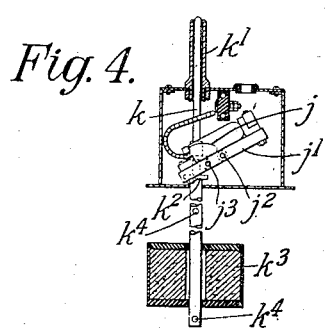
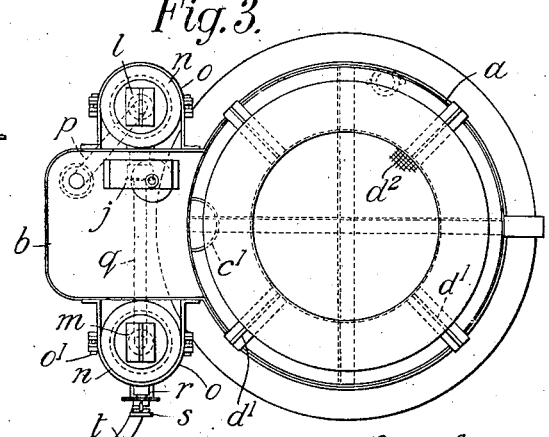

2,378,134

UNITED STATES PATENT OFFICE 2,378,134

APPARATUS FOR PREPARING SOLUTIONS

David Johnson Evans, Tonbridge, England, assignor to E. C. D. Limited, Tonbridge, Kent, England Application December 8, 1941, Serial No. 422,179
In Great Britain December 27, 1940

4 Claims. (Cl. 137—78)

This invention relates to the preparation of solutions, such as brine to be employed for the electrolytic production of hypochlorites.

The main object of the invention is to provide simple and automatic apparatus for the preparation of such solutions. Another object is to provide for forming solutions of any desired concentration by first preparing a concentrated solution and then diluting said solution down to the required strength, the dilution being effected automatically at the time of the addition of solvent to prepare a further quantity of concentrated solution. A further object of the invention is to enable the concentration of the solution to be regulated at will by varying the proportions of the additions of solvent.

Other objects and advantages of the invention will hereinafter appear from the description of a preferred embodiment, given with reference to the accompanying drawing, in which:

Fig. 1 is a front elevation of the apparatus, as constructed for the preparation of brine for electrolytic cells.

Fig. 2 is a side elevation, and

Fig. 3 is a plan.

Fig. 4 is a detail on a larger scale of a float-operated device controlling the admission of water to the apparatus.

In the embodiment illustrated, the apparatus comprises a cylindrical container $a$, the depth of which is considerably greater than the diameter, and a second container $b$ of quite small capacity; the container $b$ is of substantially rectangular shape, mounted beside the larger container, the upper ends of the two containers being at the same level. The separating wall is formed with a notch or weir $c$ to allow liquid to overflow from one container to the other, the opening being protected by a vertical trough or screen $c^1$ to prevent the passage of any floating scum when the overflow takes place. Upon the open mouth or upper end of the container $a$ there is supported a wide-necked funnel or hopper $d$, for example by means of four radially disposed brackets $d^1$, having their vertical webs welded to the sides of the funnel; the salt fed into the hopper descends upon a grating $d^2$ at the lower end, which is well below the level of the weir $c$ so that it is always submerged. Upon the bottom of this container there is fitted a perforated coil $e^1$ forming a continuation of a feed pipe $e$ connected to the fresh water supply at $f$; the water admitted to the container $a$ dissolves the salt descending from the funnel $d$, and the saturated brine thus formed overflows at the weir $c$ into the second container $b$, which is simultaneously fed with water through a separate pipe $g$ connected to the fresh water supply, so as to dilute the brine received over the weir $c$. An emergency overflow is provided in the form of a spout $a^1$ near the top of the container $a$ to prevent flooding of the apparatus.

The feed pipes $e$, $g$ supplying water to the two containers are fitted with regulating valves $h$, $h^1$ by the adjustment of which the proportions admitted to the respective containers can be varied in order to prepare brine of any required concentration in the second container, from which delivery takes place; for example, if the valves are adjusted to admit equal volumes of water to both containers, then one volume of saturated brine displaced from the first container will be mixed with one volume of water admitted to the second container, providing approximately two volumes of solution at the desired concentration. The control of percentage is simply and quickly effected by using a suitably graduated hydrometer, continually floating in the second container; such hydrometer is not illustrated in the drawing.

The admission of water to the two containers is controlled by a valve $i$ inserted in the main supply pipe $f$, in advance of the two regulating valves $h$, $h^1$; the control valve is preferably of the electromagnetically operated type, its magnet winding $i^1$ being connected to a source of current at $x$ by way of a mercury switch $j$ so that the closing of this circuit opens the control valve. As seen more clearly in Fig. 4, the switch lever $j^1$ is overbalanced on a fulcrum $j^2$ and actuated by a light rod $k$ sliding vertically in a guide $k^1$ fixed to the top of the second container; the rod carries a double collar $k^2$ engaging a pin $j^3$ upon the switch lever and the lower end of the rod carrying a float $k^3$ slidable up and down between fixed stops $k^4$ on the rod, the float resting on the surface of liquid in said second container $b$. When the level in the container $b$ rises sufficiently, and approximately at the moment when the liquid therein reaches the level of the weir $c$, the float $k^3$ rises and reverses the switch lever $j^1$, thus opening the circuit of which it forms part and causing the valve $i$ to shut off the supply to both containers. The displacement of the mercury from one end of the lever $j^1$ to the other as the switch is reversed tends to maintain the lever and rod $k$ in the new position. As soon as the container $b$ empties sufficiently for the float $k^3$ to engage the lower stop $k^4$, the rod $k$ is pulled down to restore the switch to closed position and thereby energize the magnet winding $i^1$ to open the valve $i$, water is admitted once more to both compartments, the switch lever remaining overbalanced in the position of Fig. 4 until the level in the second container is restored to normal. The refilling therefore takes place periodically whenever the second container is approaching exhaustion, and the smallness of the said second container enables a relatively quick change in the concentration to be had whenever desired. The water supply is admitted at full rate, however slowly the solution may be drawn off. This arrangement prevents undesired variations of the amounts entering the respective containers, as might happen with a slow admission of water; it also eliminates the possibility of different heads in the two containers altering the proportional delivery through the regulating valves on the two feed pipes, the first container being always full up to the level of the weir and the second container being preferably fed with fresh water through an open-ended pipe g so that the rate of delivery is independent of the varying level during the refilling operation.

In the apparatus illustrated, the brine solution is employed for the electrolytic production of hypochlorites, two electrolytic cells l, m being shown mounted at back and front of the container by each of these cells is fitted with an upper extension n in the form of an open-ended cylinder connected to the top of the cell by a screw-threaded joint $n^1$ having a rubber packing washer $n^2$, and the two extensions or cylinders n are clamped against the container b by sheet metal clips o and bolts $o^1$. The two cylinders n extend up substantially to the level of the top of the containers a, b, and they form venting chambers for the escape of hydrogen gas evolved within the cells by the electrolytic action.

The solution prepared in the container b passes down through an ebonite tube p to the bottom of the back cell l, and the liquid from the top of this cell flows out of the corresponding cylinder n through another ebonite tube q to the bottom of the front cell m; after electrolytic treatment in the two cells l, m, thus connected in cascade, the final product is delivered from the cylinder n at the top of the front cell m by way of an angle fitting or draw-off nipple r, a regulating valve s, clamped to the cell m, and a rubber hose pipe t leading the the point of utilization.

The electrical lead-in connections u of the two cells may be coupled in series or in parallel and supplied with current from the same source x as the electromagnetic valve winding $i^1$ and float-operated switch j; a master switch controlling the several circuits, as indicated at v in Fig. 1, enables the apparatus to be brought into operation at any moment desired, the cells l, m being always filled with liquid in readiness for use and the cylinder n of the front cell providing a small reserve of hypochlorite product for instantaneous delivery.

It will be obvious, however, that the electrolytic cells and the valve-switch combination may be supplied with current from separate sources, for example a storage battery and alternating current mains respectively, or that the cells may be supplied by a rectifier or motor generator fed from the mains which supply current to the valve-switch combination.

The invention may of course be applied to apparatus for preparing solutions other than brine for electrolytic cells.

What I claim is:

1. Apparatus for preparing solutions at desired concentrations, comprising two containers, one of said containers being large and the other being small, an overflow device located near the top of said large container and delivering to the other container, means for supplying solvent simultaneously to both containers, means for feeding an excess of a soluble substance to said large container for preparing a concentrated solution of said substance therein, means governed by the level in said other container for controlling the simultaneous supply of solvent to both containers, said level-governed means initiating the supply of solvent whenever said other container is approaching exhaustion, and means for regulating the proportions of solvent supplied to the respective containers.

2. Apparatus for preparing solutions at desired concentrations, comprising two containers, one of said containers being large and the other being small, an overflow device located near the top of the larger of said containers and delivering to the other container, means for supplying solvent simultaneously to both containers, means for feeding an excess of a soluble substance to said large container for preparing a concentrated solution of said substance therein, a float mounted in said other container, means for controlling said solvent-supplying means by the rise and fall of said float, the containers being so related and the control means being so constructed and arranged that the supply starts periodically when the level in said other container is low and continues until both containers are substantially full, and means for regulating the proportions of solvent supplied to the respective containers.

3. Apparatus for preparing solutions, comprising two connected containers, one of said containers being large and the other being small, a hopper adapted to stock a substance to be dissolved and to feed said substance gradually to the lower part of said larger container, means for supplying a solvent to the lower part of said large container for preparing a concentrated solution of said substance therein, means for supplying solvent to the other of said containers, and means governed by the level in said other container for controlling simultaneous supply of solvent to both containers, said level-governed means initiating the supply of solvent whenever said other container is approaching exhaustion and cutting off the flow of solvent when such other container is substantially full, and the concentrated solution in said large container overflowing from the upper part thereof into the other connected container during the supply of solvent.

4. Apparatus for preparing solutions at desired concentrations, comprising two containers, one of said containers being large and the other being small, an overflow device located near the top of said large container and delivering to the other container, electrically controlled means for supplying solvent simultaneously to both containers, means for feeding an excess of a soluble substance to said large container for preparing a concentrated solution of said substance therein, a float within said other container, a vertically guided rod mounted in said other container, stops fixed at upper and lower levels upon said rod, said float being slidable between said stops upon said rod, a switch governed by the vertical movements of said rod due to the rise and fall of said float, said switch controlling said solvent-supplying means to initiate the supply of solvent whenever said float engages the lower of said stops upon said rod and to cut off the flow of solvent when said other container is substantially full, and means for regulating the proportions of solvent supplied to the respective containers.

DAVID JOHNSON EVANS.